(12) United States Patent
Berger et al.

(10) Patent No.: US 9,972,213 B1
(45) Date of Patent: May 15, 2018

(54) MONITORING STUDENT FOCUS IN A LEARNING ENVIRONMENT

(71) Applicant: Amplify Education, Inc., New York, NY (US)

(72) Inventors: Lawrence Jason Berger, New York, NY (US); Laurence E. Holt, Brooklyn, NY (US); Robert Del Principe, Brooklyn, NY (US); Don Eschenauer, Brooklyn, NY (US)

(73) Assignee: Amplify Education, Inc., Brooklyn, NY (US)

( * ) Notice: Subject to any disclaimer, the term of this patent is extended or adjusted under 35 U.S.C. 154(b) by 217 days.

(21) Appl. No.: 14/460,847

(22) Filed: Aug. 15, 2014

Related U.S. Application Data

(60) Provisional application No. 62/011,141, filed on Jun. 12, 2014.

(51) Int. Cl.
  *G09B 3/00* (2006.01)
  *G09B 5/02* (2006.01)

(52) U.S. Cl.
  CPC ..................... *G09B 5/02* (2013.01)

(58) Field of Classification Search
  CPC ... G09B 5/08; G09B 5/10; G09B 5/12; G09B 5/14; G09B 5/02
  USPC ........................................................ 434/350
  See application file for complete search history.

(56) References Cited

U.S. PATENT DOCUMENTS

| | | | | |
|---|---|---|---|---|
| 6,208,832 B1* | 3/2001 | Remschel | ................ | G09B 7/02 434/322 |
| 2002/0172931 A1* | 11/2002 | Greene | .................... | G09B 7/00 434/322 |
| 2003/0028588 A1* | 2/2003 | McConnell | .............. | G09B 7/00 709/203 |
| 2006/0174338 A1* | 8/2006 | Winneg | .................. | G06F 21/52 726/16 |
| 2007/0048723 A1* | 3/2007 | Brewer | ..................... | G09B 7/02 434/350 |
| 2007/0117083 A1* | 5/2007 | Winneg | .................... | G09B 7/00 434/350 |
| 2008/0050715 A1* | 2/2008 | Golczewski | ..... | G06Q 10/06311 434/350 |
| 2008/0108038 A1* | 5/2008 | Rogers | ..................... | G09B 7/00 434/350 |
| 2008/0166686 A1* | 7/2008 | Cook | ........................ | G09B 5/00 434/118 |
| 2009/0035733 A1* | 2/2009 | Meitar | ..................... | G09B 7/00 434/118 |
| 2012/0042358 A1* | 2/2012 | Kondur | ................. | G06F 21/316 726/3 |
| 2012/0077177 A1* | 3/2012 | Foster | ..................... | G09B 7/02 434/362 |

(Continued)

*Primary Examiner* — Michael Grant
(74) *Attorney, Agent, or Firm* — Fish & Richardson P.C.

(57) ABSTRACT

An indication of a portion of a lesson to be viewed by students is received. Computing devices of the students are notified that the portion of the lesson is to be viewed and student interaction information that indicates whether the students are viewing the portion of the lesson plan on the computing devices is received. An amount of the students viewing the portion of the lesson is determined based on the student interaction information and task information that indicates the determined amount of the students that are viewing the portion of the lesson is provided.

17 Claims, 12 Drawing Sheets

(56) References Cited

U.S. PATENT DOCUMENTS

| | | | | |
|---|---|---|---|---|
| 2012/0082974 A1* | 4/2012 | Shustorovich | ............ | G09B 5/00 |
| | | | | 434/429 |
| 2012/0135388 A1* | 5/2012 | Foster | ....................... | G09B 7/02 |
| | | | | 434/362 |
| 2012/0176220 A1* | 7/2012 | Garcia | ...................... | G09B 7/00 |
| | | | | 340/5.83 |
| 2014/0160153 A1* | 6/2014 | Singh | ................... | G06Q 10/101 |
| | | | | 345/629 |
| 2014/0222995 A1* | 8/2014 | Razden | .................... | G09B 7/02 |
| | | | | 709/224 |
| 2014/0255897 A1* | 9/2014 | Salisbury | ................. | G09B 5/08 |
| | | | | 434/350 |
| 2014/0335497 A1* | 11/2014 | Gal | ......................... | G09B 7/00 |
| | | | | 434/323 |
| 2014/0356845 A1* | 12/2014 | Huber | ...................... | G09B 5/08 |
| | | | | 434/362 |
| 2014/0370484 A1* | 12/2014 | Hermosura | .............. | G09B 5/06 |
| | | | | 434/350 |

\* cited by examiner

FIG. 8

MONITORING STUDENT FOCUS IN A LEARNING ENVIRONMENT

CROSS-REFERENCE TO RELATED APPLICATION

This application claims the benefit of U.S. Provisional Application Ser. No. 62/011,141, filed on Jun. 12, 2014, which is incorporated by reference.

TECHNICAL FIELD

This specification relates to education.

BACKGROUND

In certain circumstances, computing devices may be used in learning environments.

SUMMARY

In some aspects, the subject matter described in this specification may be embodied in methods that may include the actions of receiving an indication of a portion of a lesson to be viewed by students. Additional actions may include notifying computing devices of the students that the portion of the lesson is to be viewed and receiving student interaction information that indicates whether the students are viewing the portion of the lesson plan on the computing devices. Further actions may include determining an amount of the students viewing the portion of the lesson based on the student interaction information and providing task information that indicates the determined amount of the students that are viewing the portion of the lesson.

Other implementations include corresponding systems, apparatus, and computer programs, configured to perform the actions of the methods, encoded on computer storage devices.

These and other implementations may each optionally include one or more of the following features. For instance, in some implementations, determining an amount of the students viewing the portion of the lesson based on the student interaction information may include determining a percentage of students viewing the portion of the lesson based on the student interaction information.

In some aspects, the student interaction information may identify students and for each student, indicate whether the computing device of the identified student is displaying or is not displaying the portion of the lesson. In certain aspects, the task information may include a percentage of students viewing the portion of the lesson. In some implementations, the task information describes what is currently being displayed on the computing devices.

In some aspects, the actions may further include, after providing task information that indicates the determined amount of the students that are viewing the portion of the lesson, receiving updated student interaction information that indicates whether the students are viewing the portion of the lesson plan on the computing devices. Additional actions may include determining an updated amount of the students viewing the portion of the lesson based on the updated student interaction information and providing updated task information that indicates the determined updated amount of the students that are viewing the portion of the lesson.

The details of one or more implementation are set forth in the accompanying drawings and the description below. Other potential features, aspects, and advantages of the subject matter will become apparent from the description, the drawings, and the claims.

DESCRIPTION OF DRAWINGS

FIG. 8 is an example of a user interface that displays an activity associated with a card.

Like reference symbols in the various drawings indicate like elements.

DETAILED DESCRIPTION

Figure 1:
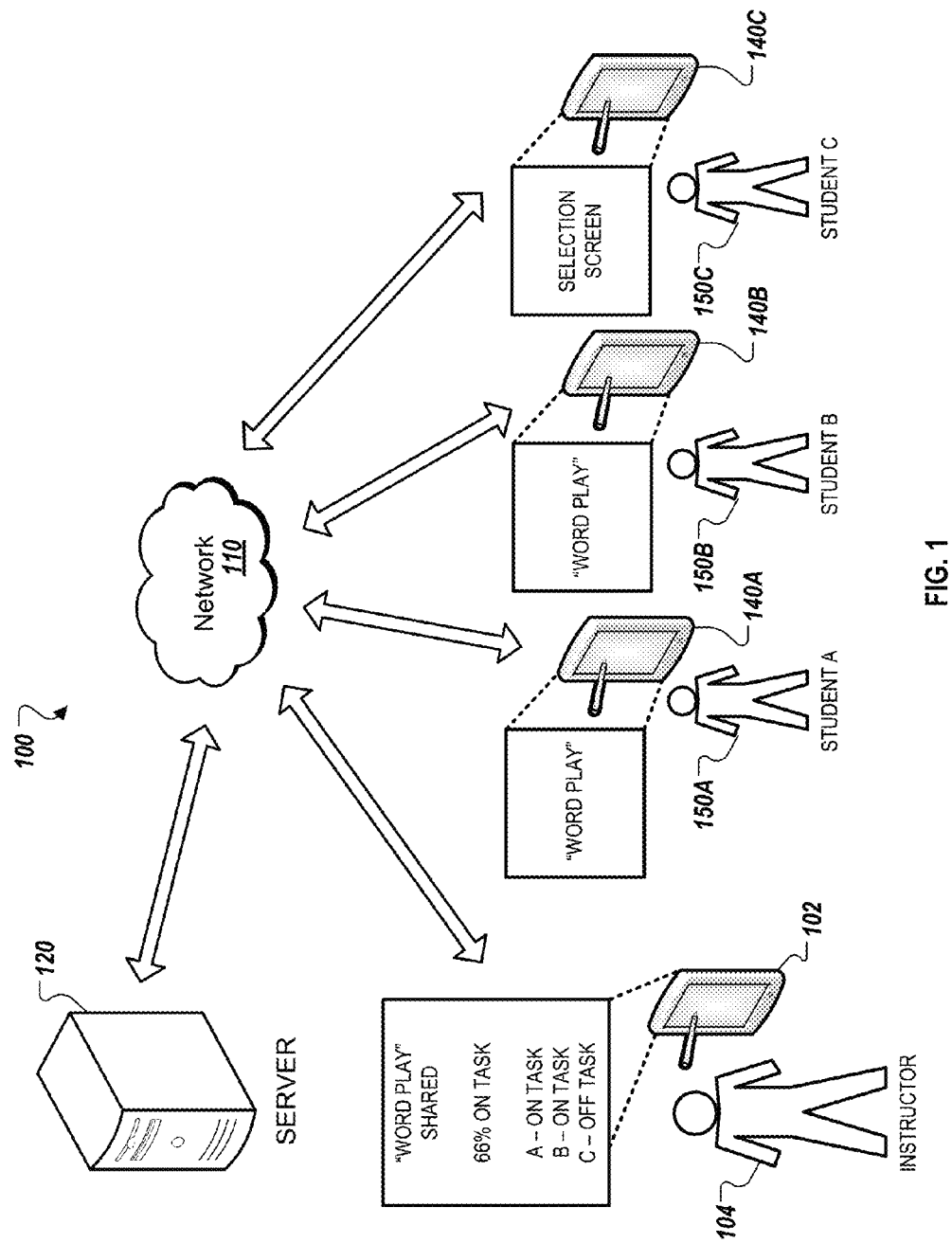
FIG. 1 is a block diagram of an example of a system architecture that enables monitoring of computing devices of students in a learning environment.

FIG. 1 is a block diagram of an example of a system 100 that enables the monitoring of student devices 140A-C used by students 150A-C in a learning environment. Briefly, the system 100 includes an instructor device 102 that may be used by an instructor 104 to teach the students 150A-C, student devices 140A-C that may be used by the students 150A-C to learn, and a server 120 that may facilitate communications between the student devices 140A-C and the instructor device 102 over a network 110.

The instructor device 102 may be a computing device used by the instructor 104. A computing device may be a tablet computer, a smartphone, a laptop computer, a desktop computer, or other appropriate computing device. The instructor device 102 may be used by the instructor 104 to notify students 150A-C to view particular educational content on the student devices 140A-C and may be used by the instructor 104 to view information indicating if the students 150A-C are viewing the particular educational content. For example, the instructor 104 may use the instructor device 102 to notify the students 150A-C to view educational content corresponding to "WORD PLAY" and the instructor device 102 may then display information indicating that 66% of the students 150A-C are viewing the educational content corresponding to "WORD PLAY."

The instructor device 102 may be used to notify students 150A-C to view particular educational content based on providing an interface through which the instructor 104 may share educational content, such as a portion of a lesson. When the instructor 104 uses the instructor device 102 to share a portion of a lesson, an indication that the instructor 104 wants the students 150A-C to view what is shared may be provided to the student devices 140A-C. In some implementations, the student devices 140A-C may already store the educational content before the instructor 104 shares the educational content. Accordingly, the act of sharing may not provide the educational content to the students 150A-C but may provide a notification that the educational content should be viewed by the students 150A-C. In other cases, the educational content may be sent to the student devices 140A-C when the instructor shares the educational content.

To enable sharing, the instructor device 102 may output an interface that displays different portions of a lesson and that is configured to receive an indication that the instructor 104 has shared a portion of a lesson, e.g., the portion entitled "WORD PLAY." In response to receiving an indication to share a portion of a lesson from the instructor 104, the instructor device 102 may transmit an indication of the shared portion of the lesson to the server 120. For example, in response to receiving an indication to share the portion entitled "WORD PLAY," the instructor device 102 may transmit an indication to the server 120 that the portion "WORD PLAY" was shared by the instructor 104. The server may then share the portion indicated with the student devices 140A-C.

The instructor device 102 may be used to view information indicating if the students 150A-C are viewing the particular educational content based on task information received from the server 120. The task information may indicate an amount of students 150A-C that are viewing the particular educational content on their corresponding student devices 140A-C. For example, the task information may indicate a percentage of students 150A-C, e.g., 66%, of students that are viewing the portion entitled "WORD PLAY" or a number of students 150A-C, e.g., two out of three, that are viewing the portion.

In some implementations, the task information may describe what is currently being displayed on the student devices 140A-C. For example, the task information may include screenshots from displays of the student devices 140A-C, or descriptions of what is being shown on the displays of the student devices 140A-C. The instructor device 102 may then determine the amount of students viewing the particular educational content based on the task information that describes what is currently being displayed on the student devices 140A-C, and display an indication of the determined amount. For example, based on sharing by the instructor 104 of the portion entitled "WORD PLAY," the instructor device 102 may receive task information that describes that student device 140A is displaying a portion entitled "WORD PLAY," student device 140B is also displaying the portion, but student device 140C is displaying a selection screen, and determine that 66% of the students 150A-C are viewing the portion entitled "WORD PLAY," and output "66% on task" that indicates that 66% of the students are viewing the portion entitled "WORD PLAY."

Additionally or alternatively, the instructor device 102 may display an indication for each student whether or not the student is viewing the portion shared by the instructor 104. For example, the instructor device 102 may display text, e.g., "A—ON TASK; B—ON TASK; C—OFF TASK," that indicates that student device 140A is displaying a portion entitled "WORD PLAY," student device 140B is also displaying the portion, but student device 140C is not displaying the portion. In this example, the instructor device 102 may not show or indicate what a student device that is not displaying the portion is actually displaying, but only indicate that the student device is not displaying the portion.

Where the task information describes what is currently being displayed on the student devices 140A-C, the instructor device 102 may additionally or alternatively enable the instructor 104 to view what is currently being displayed on the student devices 140A-C. For example, the instructor device 102 may display text, e.g., "A—WORD PLAY; B—WORD PLAY; C—SELECTION SCREEN," that describes that student device 140A is displaying a portion entitled "WORD PLAY," student device 140B is also displaying the portion, but student device 140C is displaying a selection screen. The instructor device 102 may then allow the instructor 104 to select the student device 140C and may then display a thumbnail image of what is being shown on the screen of the student device 140C.

In some implementations, the instructor device 102 may only indicate what is being displayed on the student devices 140A-C for student devices 140-C that are not viewing the shared portion. For example, the instructor device 102 may determine that only student device 140C is not displaying the shared portion "WORD PLAY" and display a thumbnail image of what is displayed on student device 140C, along with an indication that the thumbnail is from student device 140C or for student 150C.

In some implementations, the instructor device 102 may describe what is being displayed on the student devices 140A-C by default. For example, the instructor device 102 may show a percentage of students 150A-C viewing the shared portion of a lesson and an indication, e.g., "A—WORD PLAY; B—WORD PLAY; C—SELECTION SCREEN," of what is being displayed on the student devices 140A-C, unless the instructor 104 requests the instructor device 102 not to display the description of what is being displayed on the student devices 140A-C.

Alternatively, the instructor device 102 may not describe what is being displayed on the student devices 140A-C until the instructor 104 requests to view descriptions of what is being displayed on the student devices 140A-C. For example, the instructor device 102 may show a percentage of students 150A-C viewing the shared portion of a lesson without a description of what is being displayed on the student devices 140A-C until the instructor 104 interacts, e.g., tap, click, select, with the shown percentage of students.

In some implementations, the instructor device 102 may receive the task information from the student devices 140A-C instead of from the server 120 or receive the task information from both the student devices 140A-C and the server 120. For example, the instructor device 102 may receive task information from each of the student devices 140A-C that indicates if the student device is displaying the shared particular educational content.

The information displayed by the instructor device 102 that indicates if the students 150A-C are viewing the particular educational content may help the instructor 104 determine how to teach the students 150A-C. For example, the instructor 104 may tell the student 150C that is not viewing the particular educational content corresponding to "WORD PLAY" to view the particular educational content, e.g., by saying something in a physical classroom setting or sending a personal electronic message to the student in a virtual classroom setting. Additionally or alternatively, the instructor 104 may wait for the student 150C that is not viewing the particular educational content to view the particular educational content and may provide further explanation to help the student 150C understand what was taught before the instructor 104 requested that the students 150A-C view the particular educational content.

The student devices 140A-C may be computing devices that are used by the students 150A-C. The student devices 140A-C may be used by the students 150A-C to learn. For example, the student devices 140A-C may display portions of lessons to the students 150A-C. The student devices 140A-C may receive notifications indicating the particular educational content that an instructor 104 has shared. For example, the student devices 140A-C may each receive a notification that the instructor 104 has shared a portion entitled "WORD PLAY" to be viewed by the students 150A-C.

The student devices 140A-C may provide the students 150A-C indications that the instructor 104 has shared the particular educational content to be viewed by the students 150A-C. For example, in response to a notification that the instructor 104 has shared a portion entitled "WORD PLAY" to be viewed by the students 150A-C, the student devices 140A-C may display an indication to the students 150A-C that the instructor 104 has shared a portion entitled "WORD PLAY" to be viewed by the students 150A-C. The indication may be a textual message, e.g., "SHARED," or a change in an appearance of an icon, e.g., an icon representing the shared portion is enlarged.

The student devices 140A-C may provide to the server 120 student interaction information that indicates whether the students 150A-C are viewing the particular educational content shared by the instructor 104. The student interaction information may identify students 150A-C and indicate what is currently being displayed on the student devices 140A-C of the identified students 150A-C.

The student interaction information may provide a Boolean type indication, e.g., a "YES" or a "NO." For example, the student interaction information may include a "YES" indicating that the student device 140A of student 150A is displaying the portion entitled "WORD PLAY" of a lesson, a "YES" indicating that student device 140B of student 150B is displaying the portion, and a "NO" indicating that student device 140C of student 150C is not displaying the portion.

Alternatively or additionally, the student interaction information may provide a non-Boolean indication that describes what the student devices 140A-C were specifically displaying. For example, the student interaction information may describe that the student device 140A of student 150A is displaying the portion entitled "WORD PLAY" of a lesson, that student device 140B of student 150B is displaying the portion, and that student device 140C of student 150C is displaying a selection screen.

In some implementations, the student devices 140A-C may provide the server 120 the student interaction information each time the students 150A-C interact with the student devices 140A-C. For example, every time a student switches between different portions of lessons, different lessons, or different applications, the student device of the student may transmit student interaction information that indicates that switch to the server 120.

Additionally or alternatively, the student devices 140A-C may provide the server 120 the student interaction information at periodic intervals. For example, every ten seconds, the student devices 140A-C may transmit student interaction information to the server 120.

Additionally or alternatively, in some implementations, the student devices 140A-C may provide student interaction information in response to requests from the server 120 or an instructor device 102. For example, the student devices 140A-C may provide student interaction information that indicates whether students are viewing shared portions of lessons, e.g., viewing or not viewing, every time the students 150A-C interact with the student devices 140A-C, but may not provide detailed indications of what the students are viewing, e.g., screenshots, until the instructor 104 uses the instructor device 102 to request to view what is being displayed on a particular student device 140A-C.

The server 120 may facilitate communications between the student devices 140A-C and the instructor device 102 over a network 110. For example, the server 120 may receive the indications from the instructor device 102 of particular educational contents shared by the instructor 104 to be viewed on the student devices 140A-C by the students 150A-C. The indications received by the server 120 may be the indications, described above, that may be provided by the instructor device 102.

The server 120 may provide notifications to student devices 140A-C of the particular educational contents shared by the instructor 104 to be viewed on the student devices 140A-C by the students 150A-C. The notifications provided by the server 120 may be the notifications, described above, that may be received by the student devices 140A-C.

The server 120 may receive student interaction information from the student devices 140A-C that indicates whether the students 150A-C are viewing a particular educational content on the student devices 140A-C. The student interaction information received by the server 120 may be the student interaction information, described above, that may be provided by the student devices 140A-C.

The server 120 may provide task information that indicates the determined amount of the students 150A-C that are viewing a particular educational content. The task information may be the task information, described above, that may be received by the instructor device 102.

Different configurations of the system 100 may be used where functionality of the instructor device 102, server 120, and student devices 140A-C, may be combined, further separated, distributed, or interchanged. For example, in another configuration of the system 100 the instructor device 102 may directly communicate with the student devices 140A-C without the server 120 to monitor the student devices 140A-C.

Figure 2:
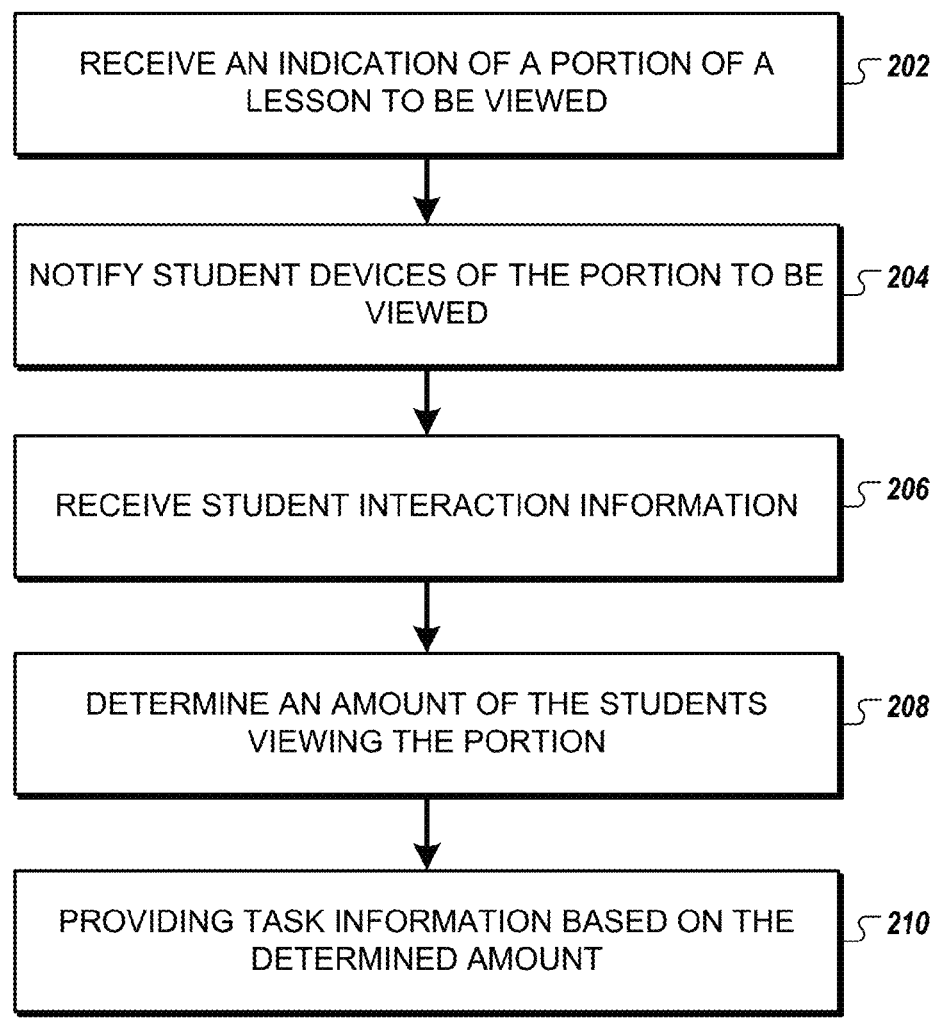
FIG. 2 is a flowchart showing an example of a process for monitoring of computing devices of students in a learning environment.

FIG. 2 is a flowchart showing an example of a process 200 for monitoring of computing devices of students in a learning environment. The following describes the process 200 as being performed by components of the system 100 that are described with reference to FIG. 1. However, the process 200 may be performed by other systems or system configurations. Briefly, the process 200 includes receiving, by the server 120, an indication of a portion of a lesson to be viewed, notifying student devices 140A-C of the portion to be viewed, receiving student interaction information, determining an amount of the students 150A-C viewing the portions, and providing task information based on the determined amount.

In more detail, when process 200 begins, the server 120 may receive an indication from the instructor device 102 of a portion of a lesson to be viewed (202). For example, before the instructor 104 begins teaching a portion entitled "WORD PLAY" of a lesson, the instructor 104 may use the instructor device 102 to share the portion to indicate to the students 150A-C that the instructor 104 wants the students 150A-C to view the portion. In response to the sharing by the instructor 104, the instructor device 102 may transmit an indication to the server 120 that the portion "WORD PLAY" should be viewed by the students 150A-C. The server 120 may then receive the indication that the portion "WORD PLAY" should be viewed by the students 150A-C.

In response to receiving the indication from the instructor device 102, the server 120 may notify student devices 140A-C of the portion of the lesson to be viewed (204). For example, in response to receiving the indication that the portion "WORD PLAY" should be viewed by the students 150A-C, the server 120 may notify the student devices 140A-C that the portion "WORD PLAY" should be viewed by the students 150A-C. The student devices 140A-C may receive the notification and provide an indication to the students 150A-C that the students 150A-C should view the portion "WORD PLAY." The students 150A-C may then select to view the portion "WORD PLAY" and the student devices 140A-C may transmit student interaction information that indicates whether the students 150A-C are viewing the portion "WORD PLAY."

The server 120 may receive student interaction information that indicates whether the students 150A-C are viewing the portion of the lesson plan on the student devices 140A-C (206). For example, the server 120 may receive the student interaction information that indicates whether the students 150A-C are viewing the portion "WORD PLAY" that is transmitted by the student devices 140A-C. As described above, the student interaction information may provide a Boolean type indication, e.g., a "YES" or a "NO," whether each student is viewing the portion "WORD PLAY," and/or a non-Boolean type indication, e.g., "WORD PLAY," "SELECTION SCREEN," etc. describing what the student is viewing.

The server 120 may determine an amount of students 150A-C viewing the portion of the lesson based on the student interaction information (208). For example, the server 120 may determine that the student interaction information corresponds to three students 150A-C, determine that the students 150A-C should be viewing the portion "WORD PLAY," determine that two out of the three students 150A-C are viewing the portion entitled "WORD PLAY," and determine that 66% of the students 150A-C are viewing the portion entitled "WORD PLAY" that the students 150A-C should be viewing.

The server 120 may provide task information that indicates the determined amount of the students 150A-C that are viewing the portion of the lesson (210). For example, the server 120 may provide the instructor device 102 task information that indicates that 66% of the students 150A-C are viewing the portion entitled "WORD PLAY." The instructor device 102 may then display, based on the task information, that 66% of the students 150A-C are viewing the portion entitled "WORD PLAY.

While not shown, after the server 120 provides task information that indicates the determined amount of the students 150A-C that are viewing the portion of the lesson, the server 120 may receive updated student interaction information that indicates whether the students 150A-C are viewing the portion of the lesson plan on the computing devices. The server 120 may determine an updated amount of the students 150A-C viewing the portion of the lesson based on the updated student interaction information and provide updated task information that indicates the determined updated amount of the students 150A-C that are viewing the portion of the lesson.

Figure 3:
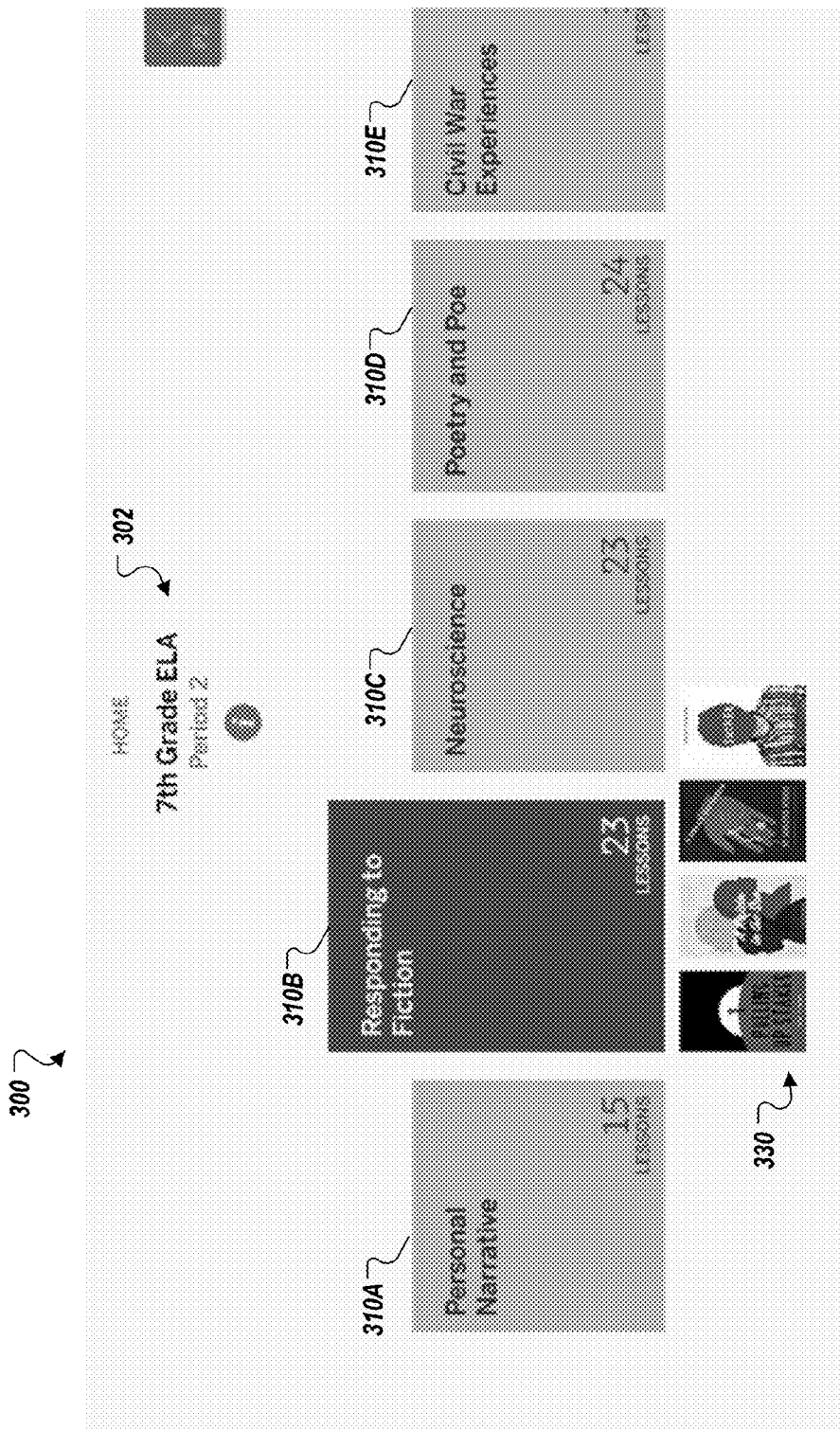
FIG. 3 is an example of a user interface that displays units of a lesson plan.

FIG. 3 is an example of a user interface 300 that displays units 310A-310E of a lesson plan 302. The user interface 300 may be displayed on an instructor device 102 for the instructor 104 to share a portion of a lesson to be viewed by students 150A-C. The user interface 300 may also be displayed on student devices 140A-C for the students 150A-C to view the shared portion of the lesson.

An instructor 104 may teach students 150A-C in accordance with a lesson plan that is based on activities. Activities may include actions for students 150A-C. For example, activities may include answering questions individually or collaboratively, reading a definition of a word, or following along text read by the instructor 104.

One or more activities may be associated with cards. Cards may be sets of one or more activities that the instructor 104 may ask the students 150A-C to perform. For example, a card may include three activities where each activity asks the students 150A-C to answer a question. The particular educational content that the instructor 104 may share with the students 150A-C may be cards. For example, the instructor 104 may share individual cards to request that the students 150A-C view the activities corresponding to the cards on the student devices 140A-C.

Sets of cards may correspond to lessons. For example, a particular lesson may include a particular set of cards. One of the cards may relate to asking students 150A-C to read a definition of a concept, another card may relate to asking the students 150A-C to follow along as the instructor 104 reads text related to the concept, and another card may relate to asking the students 150A-C to answer questions related to the concept.

Sets of lessons may correspond to units 310A-C. For example, a unit may include lessons relating to teaching students about a concept and another unit may include lessons relating to teaching students about another related concept. Multiple units 310A-C may correspond to a lesson plan. For example, a lesson plan may include a unit relating to "RESPONDING TO FICTION" 310B and a unit relating to "POETRY AND POE" 310D.

The user interface 300 displays a label 302, e.g., "7TH GRADE ENGLISH LANGUAGE ARTS (ELA)," that may indicate that the displayed lesson plan is for the second period of a particular instructor 104. The user interface 300 shows that the lesson plan includes a first unit "PERSONAL NARRATIVE" 310 that includes fifteen lessons, a second unit "RESPONDING TO FICTION" 310B that includes twenty three lessons, a third unit "NEUROSCIENCE" 310C that includes twenty three lessons, a fourth unit "POETRY AND POE" 310D that includes twenty four lessons, and a fifth unit "CIVIL WAR EXPERIENCES" 310E that includes twenty two lessons.

The user interface 300 shows that the second unit 310B is selected, as indicated by shading and enlarging of a block representing the second unit 310B, and shows that the second unit is associated with four key texts by displaying icons 330 representing the key texts. Key texts may be books that are referred to by lessons included in the units 310A-C.

Figure 4:
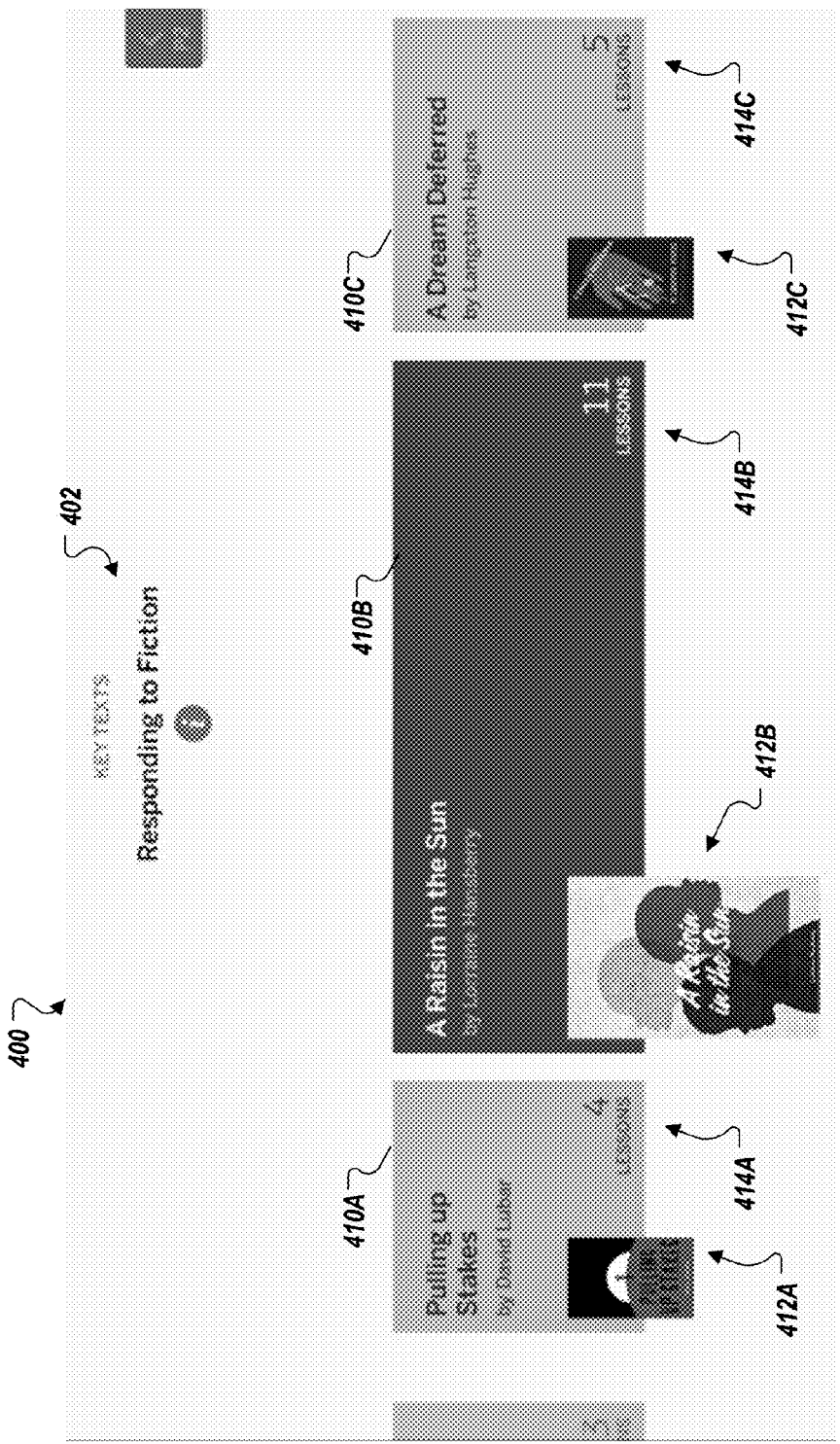
FIG. 4 is an example of a user interface that displays an overview of associated lessons and key texts of a unit.

FIG. 4 is an example of a user interface 400 that displays an overview of associated lessons and key text of a unit. The user interface 400 may be displayed once an instructor 104 or a student selects a particular unit in the user interface 300. For example, the user interface 400 may be displayed once an instructor 104 or a student selects the second unit 310B, "RESPONDING TO FICTION."

The user interface 400 may include a label 402, e.g., "KEY TEXTS, RESPONDING TO FICTION" that may indicate that the user interface 400 is showing lessons grouped by key texts for the unit "RESPONDING TO FICTION" 310B. The first indication 410A for a grouping may include an indication 414A that four lessons are associated with a first book "PULLING UP STAKES" by "DAVID LUBAR" and include an image 412A of the cover of the first book. A second indication 410B for a grouping may include an indication 414B that eleven lessons are associated with a second book "A RAISIN IN THE SUN" by "LORRAINE HANSBERRY" and include an image 412B of the cover of the second book. A third indication 410C for a grouping may include an indication 414C that five lessons are associated with a third book "A DREAM DEFERRED" by "LANGSTON HUGHES" and include an image 412C of the cover of the third book.

Figure 5:
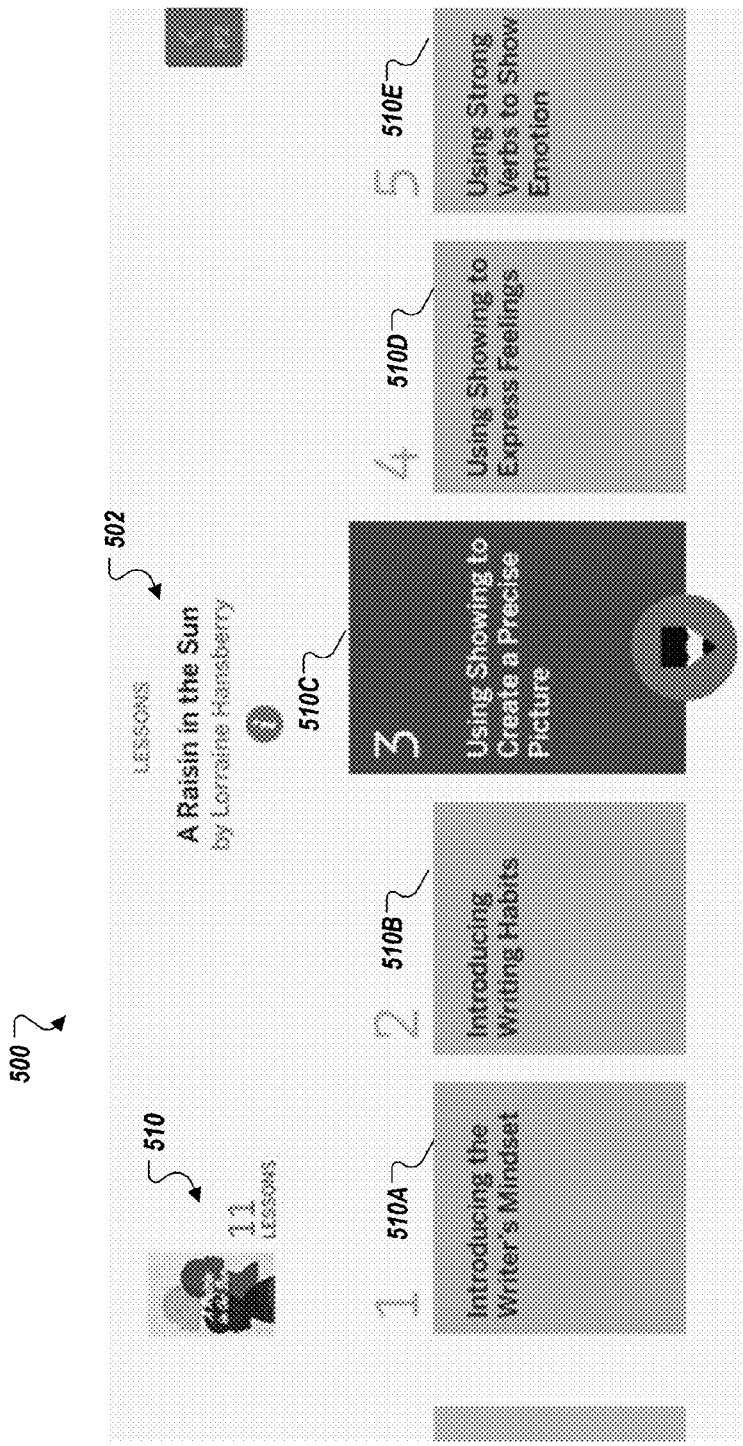
FIG. 5 is an example of a user interface that displays associated lessons of a particular key text.

FIG. 5 is an example of a user interface 500 that displays associated lessons of a particular key text. The user interface 500 may be displayed once an instructor 104 or a student selects a particular indication for a grouping of lessons in the user interface 400. For example, the user interface 500 may be displayed once an instructor 104 or a student selects the second indication 410B for the grouping of eleven lessons that are associated with the second book "A RAISIN IN THE SUN" by "LORRAINE HANSBERRY."

The user interface 500 includes a label 502, "LESSONS, A RAISIN IN THE SUN BY LORRAINE HANSBERRY," that may indicate that the lessons displayed are associated with the second book "A RAISIN IN THE SUN" by "LORRAINE HANSBERRY." The user interface 500 also includes an indicator 510 that shows an image of the second book and the number of lessons, e.g., eleven, associated with the book.

The user interface 500 further includes icons for the associated lessons, e.g., a first icon 510A for the first lesson "INTRODUCING THE WRITER'S MINDSET," a second icon 510B for the second lesson "INTRODUCING WRITING HABITS," a third icon 510C for the third lesson "USING SHOWING TO CREATE A PRECISE PICTURE," a fourth icon 510D for the fourth lesson "USING SHOWING TO EXPRESS FEELINGS," and a fifth icon 510E for the fifth lesson "USING STRONG VERBS TO SHOW EMOTION." As shown in user interface 500, the third icon 510C for the third lesson "USING SHOWING TO CREATE A PRECISE PICTURE" may be selected, as indicated by the fact that the third icon 510C is enlarged and shaded.

Figure 6A:
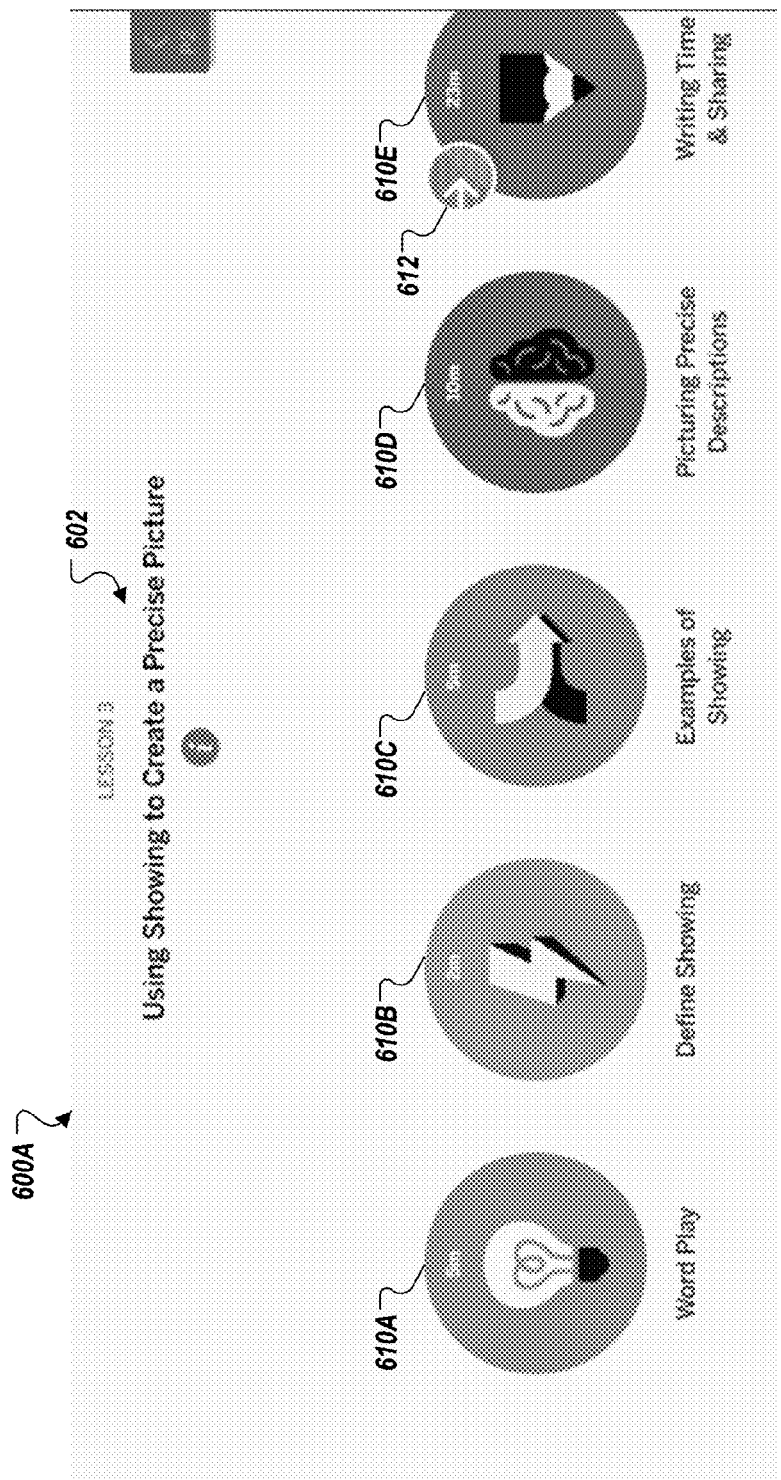
FIG. 6A is an example of a user interface that displays cards of a particular lesson.

FIG. 6A is an example of a user interface 600A that displays cards 610A-E of a particular lesson. The user interface 600A may be displayed once an instructor 104 or a student selects a particular icon for a particular lesson. For example, the user interface 600 may be displayed once an instructor 104 or a student selects the third icon 510C for the third lesson "USING SHOWING TO CREATE A PRECISE PICTURE."

The user interface 600A includes a label 602, e.g., "LESSON 3, USING SHOWING TO CREATE A PRECISE PICTURE" that may indicate that the user interface 600A is displaying cards 610A-E corresponding to the third lesson. The cards may include a first card 610A corresponding to the card "WORD PLAY," a second card 610B corresponding to the card "DEFINE SHOWING," a third card 610C corresponding to the card "EXAMPLES OF SHOWING," a fourth card 610D corresponding to the card "PICTURING PRECISE DESCRIPTIONS," and a fifth card 610E corresponding to the card "WRITING TIME & SHARING."

The fifth card 610E may also include an indication 612 that the fifth card 610E is associated with a transition. A transition may be a moment when teaching may be temporarily suspended. For example, the transition for the fifth card 610E may be a moment during which students are arranged into groups so that the students may share with one another what the students write.

Figure 6B:
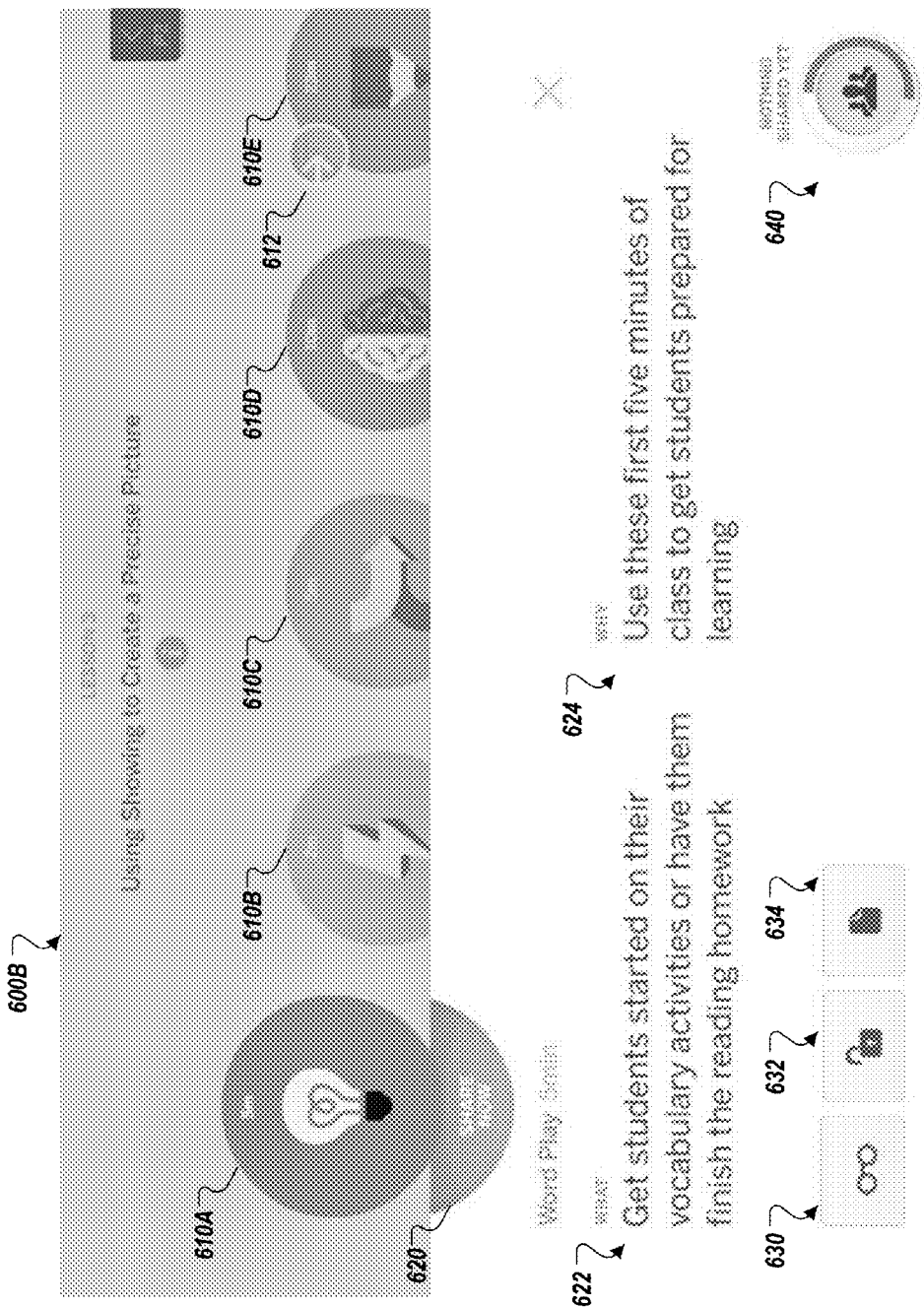
FIG. 6B is an example of a user interface that displays a selected card.

FIG. 6B is an example of a user interface 600B that displays a selected card 610A. The user interface 600B may be displayed once an instructor 104 selects a particular card in the user interface 600A. For example, the user interface 600B may be displayed once an instructor 104 selects the first card 610A "WORD PLAY."

The user interface 600B may include a share area 620. The share area 620 may appear below a selected card, e.g., the first card 610A. The instructor 104 may then interact with the selected card to share the card with the students 150A-C. When the instructor device 102 receives an indication that the instructor 104 is sharing the card, the instructor device 102 may consider the indication as a request from the instructor 104 to notify the students 150A-C to view the particular educational content corresponding to the card, e.g., the activities corresponding to card. The portion of the educational content corresponding to the card may be displayed to the students 150A-C when the students 150A-C select the corresponding card on the student devices 140A-C.

The user interface 600B includes a first detail area 622 that includes text that may indicate to the instructor 104 what the students 150A-C are supposed to be doing for the selected card. For example, the first detail area 622 may include the text, "WHAT: GET STUDENTS STARTED ON THEIR VOCABLUARY ACTIVITIES OR HAVE THEM FINISH THE READING HOMEWORK." The user interface 600B includes a second detail area 624 that includes text that may indicate to the instructor 104 why the selected card is present. For example, the second detail area 624 may include the text, "WHY: USE THESE FIRST FIVE MINUTES OF CLASS TO GET STUDENTS PREPARED FOR LEARNING."

The user interface 600B includes additional icons for interacting with the selected card. For example, the user interface 600B includes a glasses icon 630 that the instructor 104 may select to see what the students 150A-C see when the students 150A-C select the card on the student devices 140A-C. The user interface 600B includes a lock icon 632 that the instructor 104 may select to lock the selected card so that the students 150A-C can't select the card until the instructor selects the lock icon 632 again to unlock the selected card. Locking or unlocking a selected card may be useful if the instructor 104 does not wish to allow students 150A-C to view particular content until the appropriate time, e.g., when students are given a limited time for an activity. The user interface 600B includes a note icon 634 that the instructor 104 may select to take and view notes corresponding to the card. The notes that the instructor 104 takes may only be accessible by the instructor 104 and/or not be accessible by the students 150A-C.

The user interface 600B also includes a task widget 640. The task widget 640 may be an indication of the amount of students 150A-C that are viewing a portion of educational content that the instructor 104 has shared, e.g., instructed to be viewed. The task widget 640 may indicate a percentage of students 150A-C viewing a shared card. For example, the task widget 640 in the user interface 600B shows "NOTHING SHARED YET" because, while the instructor 104 may have selected the first card 610A, the instructor 104 may not have shared the first card 610 yet as the instructor 104 has not dragged the first card 610A into the share area 620 to indicate to the instructor device 102 that the instructor 104 wishes to notify the students 150A-C to display the particular educational content corresponding to the first card 610A.

Figure 6C:
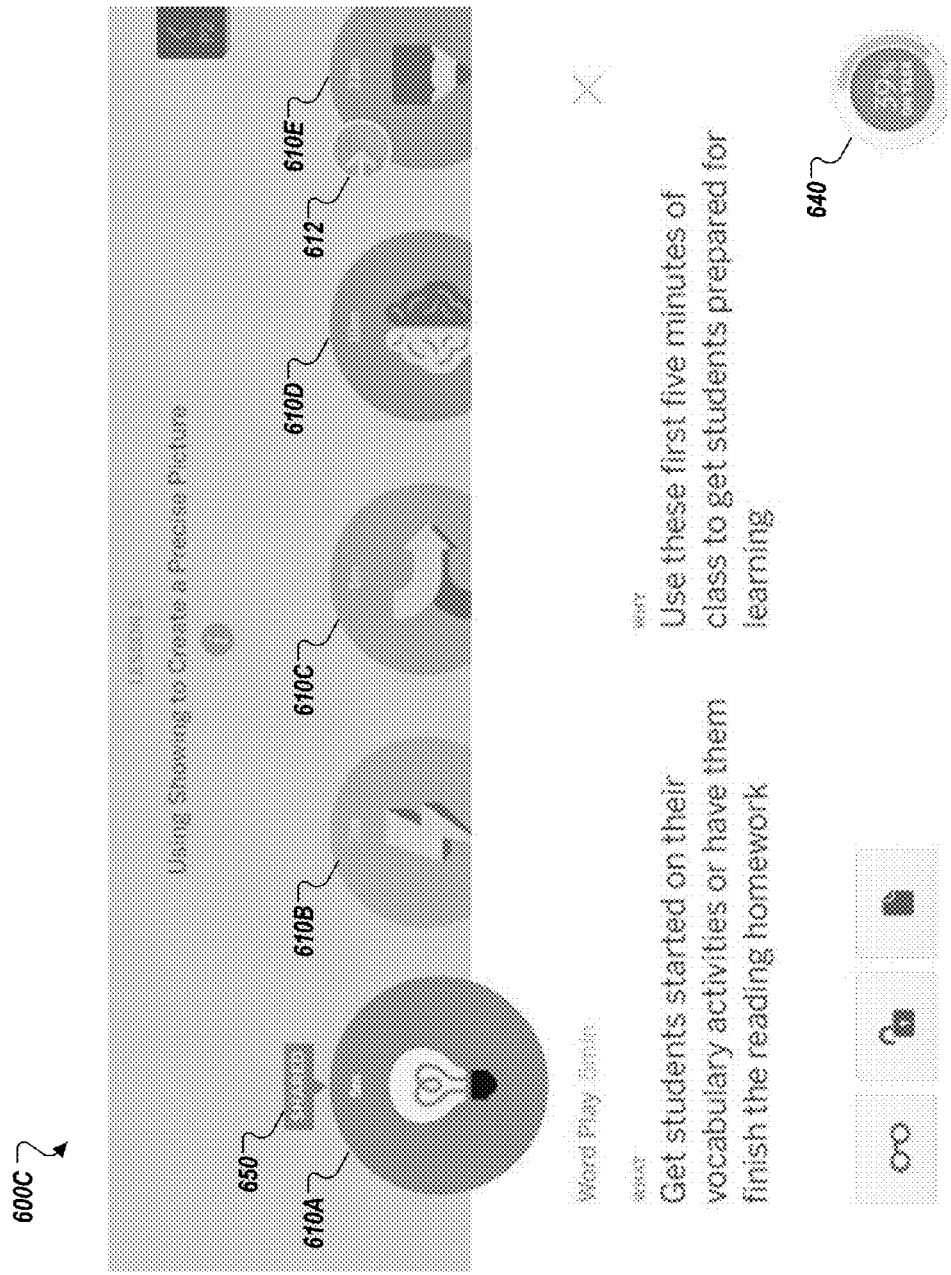
FIG. 6C is an example of a user interface that displays a shared card.

FIG. 6C is an example of a user interface 600C that displays a shared card. User interface 600C may be displayed once an instructor 104 shares a card. For example, the user interface 600C may be displayed once an instructor 104 selects the first card 610A "WORD PLAY" to be shared by dragging the first card 610A into the share area 620 shown in user interface 600B.

The user interface 600C may show a share indication 650 that indicates that a card is shared. For example, the user interface 600C includes the share indication 650 pointing to the first card 610A indicating that the first card 610A is shared. The user interface 600C displays an indication of the amount of students that are viewing a portion of educational content that the instructor 104 has shared, e.g., instructed to be viewed.

For example, the task widget 640 may show "39% ON TASK" and a circle where an arc of the circle covering 39% of the circle is colored one color. Accordingly, the instructor 104 may then adjust how the instructor 104 is teaching based on the indicated amount of students that are viewing a portion of educational content that the instructor 104 has instructed to be viewed. For example, the indication may be updated in real-time or in substantially real-time so that the instructor 104 may adjust how the instructor 104 is teaching based on the percentage shown in the task widget 640.

In some implementations, the user interface 600C may enable the instructor 104 to interact, e.g., click, tap, select, with the task widget 640 to cause the instructor device 102 to display additional information regarding what is being displayed on the student devices 140A-C. For example, the instructor 104 may tap on the task widget 640 to cause the instructor device 102 to open a window showing information listing the names of students 150A-C and if the students 150A-C are viewing the shared card, or information listing the names of students 150A-C and what the students 150A-C are viewing.

Figure 6D:
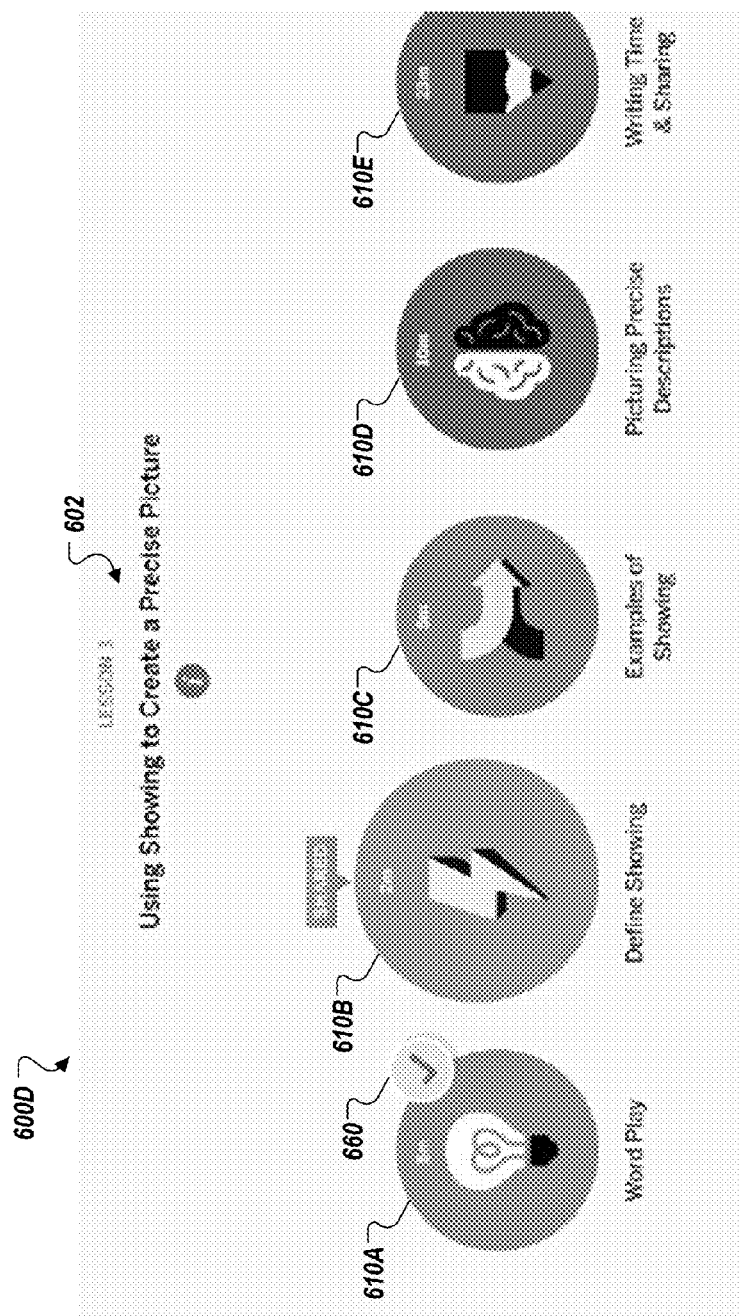
FIG. 6D is an example of a user interface that displays a completed card.

FIG. 6D is an example of a user interface 600D that displays a completed card. User interface 600D may be displayed once a shared card is completed. A shared card may be considered to be completed when all students 150A-C complete activities associated with a shared card and/or the instructor shares a subsequent card. For example, the user interface 600D may be displayed once all students 150A-C complete activities associated with the card "WORD PLAY" and the instructor 104 has shared the next card "DEFINE SHOWING." The user interface 600D shows a completion indication 660 that indicates that a card has been completed. For example, the completion indication 660 may be a checkmark in a shaded circle that is partially overlaid on the first card 610A.

Figure 7:
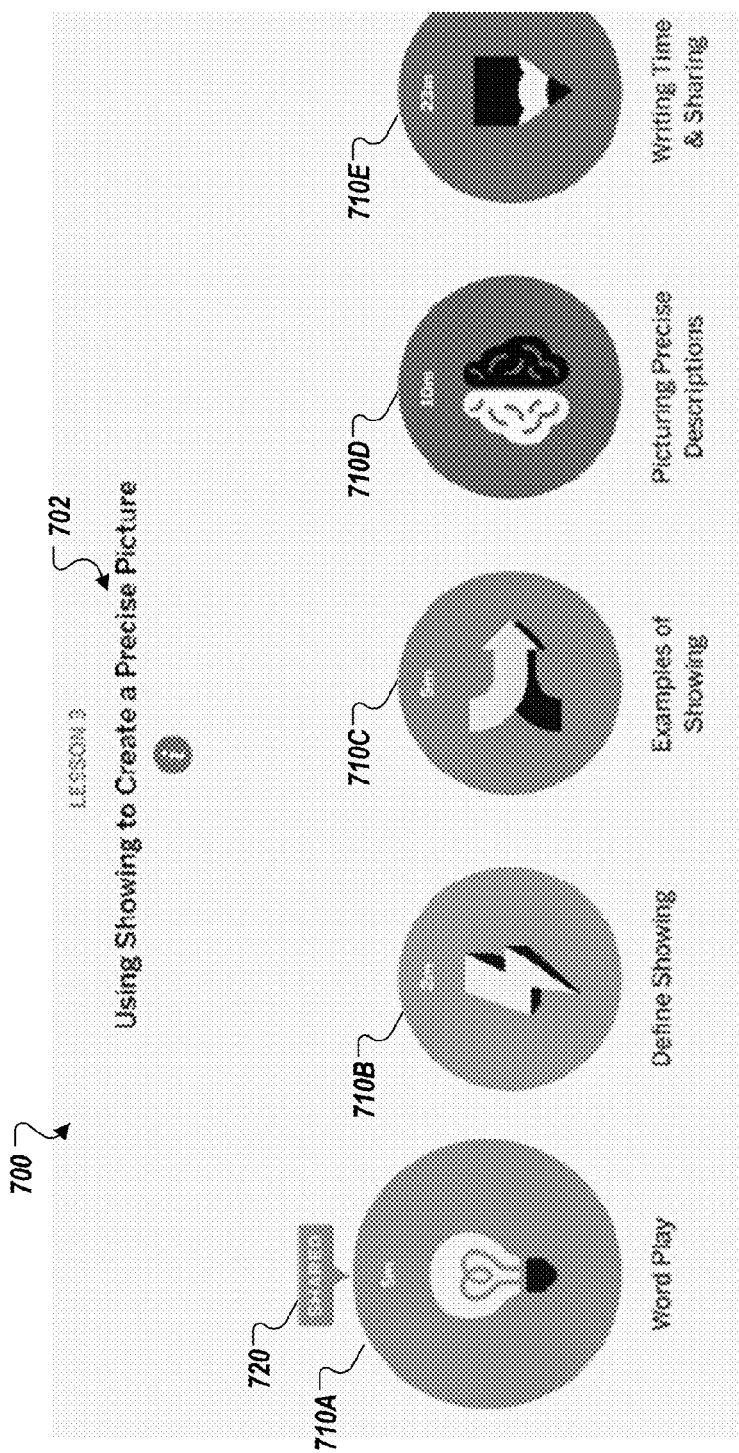
FIG. 7 is an example of a user interface that is displayed on a computing device of a student.

FIG. 7 is an example of a user interface 700 that is displayed on a student device 140A-C. User interface 700 may be shown on a student device 140A-C once the instructor 104 shares a card. For example, user interface 700 may be shown on the student device 140A-C once the instructor 104 shares the first card 610A.

The user interface 700 may be similar to the user interfaces 600A-D shown on the instructor device 102, except that the user interface 700 may not show detail areas 622, 624, glasses icon 630, lock icon 632, note icon 634, or task widget 640. The user interface 700 may show a label 702, e.g., "LESSON 3, USING SHOWING TO CREATE A PRECISE PICTURE," indicating that the user interface 700 is displaying cards 710A-E for a particular lesson and a share indication 720 above the first card 710A for "WORD PLAY." The share indication 720 may indicate that the first card 710 should be selected by the student to view the particular educational content associated with the first card 710.

While not shown, if the student device 140A-C is not yet displaying cards of a lesson, e.g., not displaying the user interface 700, a share indication may appear in relation to the next selection that the student 150A-C should make to view the shared card. For example, a share indication may appear adjacent to a unit that should be selected by the student to view key texts of the unit, after which a share indication may appear adjacent to a key text of the unit that should be selected by the student, after which a share indication may appear adjacent to a lesson of the key text that should be selected to display the user interface 700.

Figure 8:
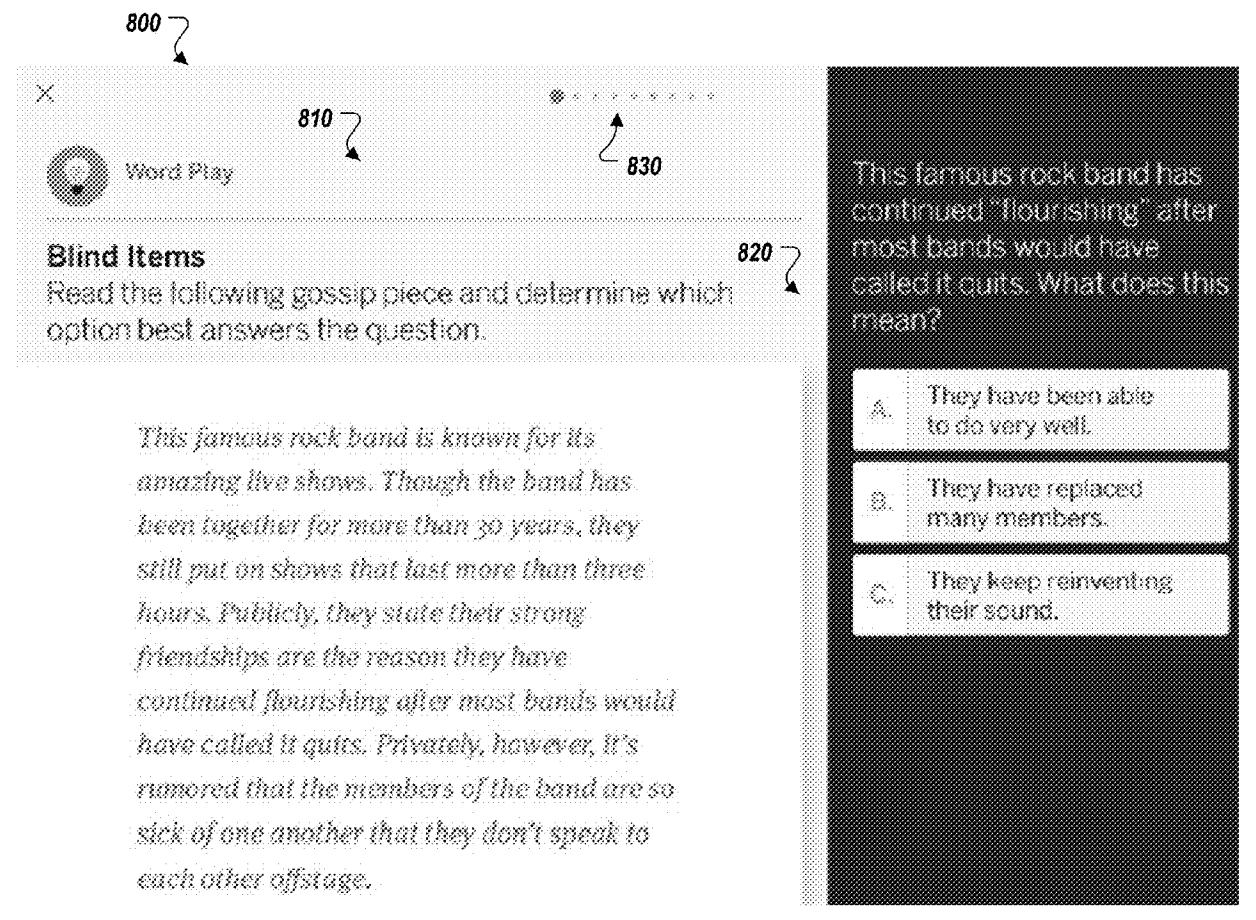

FIG. 8 is an example of a user interface 800 that displays an activity associated with a card. User interface 800 may be shown on a student device once the student selects a card. For example, user interface 800 may be shown on the student device once the student selects the first card 710A. The user interface 800 includes an instruction area 810 which may include text that instructs the students to perform a specific task, e.g., read a passage of text and answer a question. The user interface 800 includes an answer area 820 which may include answers that the student may select from. The user interface 800 includes a progress indicator 830 that may indicate the progress of the student for that activity. For example, the progress indicator 830 may show nine dots to indicate that the activity has nine questions, and make the first dot larger to indicate that the student is currently on the first question.

Figure 9:
FIG. 9 is another example of a user interface that displays an activity associated with a card.

FIG. 9 is another example of a user interface 900 that displays an activity associated with a card. User interface 900 may be shown on a student device once the student selects a card. For example, user interface 900 may be shown on the student device once the student selects a second card 710B. The user interface 900 may include a definition for the student to read.

The techniques described herein can be implemented in digital electronic circuitry, or in computer hardware, firmware, software, or in combinations of them. The techniques can be implemented as a computer program product, i.e., a computer program tangibly embodied in, e.g., computer-readable storage medium (e.g., RAM, ROM, CD, magnetic disk) for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Computer-readable media for embodying computer program instructions and data include all appropriate forms of volatile or non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method comprising:

receiving, over a network, from a teacher computing device, and by a server, an indication of educational content to be viewed by a first student on a first student computing device and by a second student on a second student computing device;

notifying, over the network and by the server, the first student computing device and the second student computing device that the educational content is to be viewed;

receiving, over the network, by the server, and from the first student computing device, first student interaction information that indicates a first activity of the first student on the first student computing device;

receiving, over the network, by the server, and from the second student computing device, second student interaction information that indicates a second activity of the second student on the second student computing device;

based on the first student interaction information, determining, by the server, that the first student is engaging, on the first student computing device, in an activity other than viewing the educational content;

based on the second student interaction information, determining, by the server, that the second student is viewing, on the second student computing device, the educational content;

based on determining that the first student is engaging in the activity other than viewing the educational content, providing, over the network, by the server, and to the teacher computing device, instructions to (i) display data indicating that the first student is engaging in the activity other than viewing the educational content and (ii) display a selectable option that, upon selection by a user, is configured to request a graphical rendering of content displayed on the first student computing device;

based on determining that the second student is viewing the educational content, providing, over the network, by the server, and to the teacher computing device, instructions to display data indicating that the second student is viewing the educational content without displaying a selectable option that, upon selection by the user, is configured to request a graphical rendering of content displayed on the second student computing device;

receiving, over the network, by the server, and from the teacher computing device, data indicating a selection of the selectable option that is configured to request a graphical rendering of content displayed on the first student computing device; and in response to receiving the data indicating the selection of the selectable option that is configured to request the graphical rendering of content displayed on the first student computing device, providing, over the network, by the server, and to the teacher computing device for display on the teacher computing device, the graphical rendering of content displayed on the first student computing device.

2. The method of claim 1, comprising:

determining a first percentage of students that include the first student and the second student who are viewing the educational content;

determining a second percentage of students that include the first student and the second student are engaging in an activity other than viewing the educational content; and providing, over the network, by the server, and to the teacher computing device for display on the teacher computing device, data indicating the first percentage of students and the second percentage of students.

3. The method of claim 1, wherein providing, over the network, by the server, and to the teacher computing device, instructions to (i) display data indicating that the first student is engaging in the activity other than viewing the educational content and (ii) display a selectable option that, upon selection by a user, is configured to request a graphical rendering of content displayed on the first student computing device comprises:

providing instructions to display data indicating what is currently being displayed on the first student computing device.

4. The method of claim 1, further comprising:

after providing instructions to (i) display data indicating that the first student is engaging in the activity other than viewing the educational content and (ii) display a selectable option that, upon selection by a user, is configured to request a graphical rendering of content displayed on the first student computing device and after providing instructions to display data indicating that the second student is viewing the educational content without displaying a selectable option that, upon selection by the user, is configured to request a graphical rendering of content displayed on the second student computing device, receiving updated student interaction information that indicates activities of the first student on the first student computing device and the second student on the second student computing device;

based on the updated student interaction information, identifying, among the first student and the second student, one or more of the students who are viewing the educational content and one or more of the students who are engaging in an activity other than viewing the educational content; and providing updated instructions to display the updated data identifying the one or more students who are viewing the educational content and updated data identifying the one or more students who are engaging in an activity other than viewing the educational content.

5. A computer-readable storage medium storing instructions that, when executed by one or more processing devices, cause the processing devices to perform operations comprising:

receiving, over a network, from a teacher computing device, and by a server, an indication of educational content to be viewed by a first student on a first student computing device and by a second student on a second student computing device;

notifying, over the network and by the server, the first student computing device and the second student computing device that the educational content is to be viewed;

receiving, over the network, by the server, and from the first student computing device, first student interaction information that indicates a first activity of the first student on the first student computing device;

receiving, over the network, by the server, and from the second student computing device, second student interaction information that indicates a second activity of the second student on the second student computing device;

based on the first student interaction information, determining, by the server, that the first student is engaging, on the first student computing device, in an activity other than viewing the educational content;

based on the second student interaction information, determining, by the server, that the second student is viewing, on the second student computing device, the educational content;

based on determining that the first student is engaging in the activity other than viewing the educational content, providing, over the network, by the server, and to the teacher computing device, instructions to (i) display data indicating that the first student is engaging in the activity other than viewing the educational content and (ii) display a selectable option that, upon selection by a user, is configured to request a graphical rendering of content displayed on the first student computing device;

based on determining that the second student is viewing the educational content, providing, over the network, by the server, and to the teacher computing device, instructions to display data indicating that the second student is viewing the educational content without displaying a selectable option that, upon selection by the user, is configured to request a graphical rendering of content displayed on the second student computing device;

receiving, over the network, by the server, and from the teacher computing device, data indicating a selection of the selectable option that is configured to request a graphical rendering of content displayed on the first student computing device; and in response to receiving the data indicating the selection of the selectable option that is configured to request the graphical rendering of content displayed on the first student computing device, providing, over the network, by the server, and to the teacher computing device for display on the teacher computing device, the graphical rendering of content displayed on the first student computing device.

6. The medium of claim 5, comprising:

determining a first percentage of students that include the first student and the second student who are viewing the educational content;

determining a second percentage of students that include the first student and the second student are engaging in an activity other than viewing the educational content; and providing, over the network, by the server, and to the teacher computing device for display on the teacher computing device, data indicating the first percentage of students and the second percentage of students.

7. The medium of claim 5, wherein providing, over the network, by the server, and to the teacher computing device, instructions to (i) display data indicating that the first student is engaging in the activity other than viewing the educational content and (ii) display a selectable option that, upon selection by a user, is configured to request a graphical rendering of content displayed on the first student computing device comprises:

providing instructions to display data indicating what is currently being displayed on the first student computing device.

8. The medium of claim 5, the operations further comprising:

after providing instructions to (i) display data indicating that the first student is engaging in the activity other than viewing the educational content and (ii) display a selectable option that, upon selection by a user, is configured to request a graphical rendering of content displayed on the first student computing device and after providing instructions to display data indicating that the second student is viewing the educational content without displaying a selectable option that, upon selection by the user, is configured to request a graphical rendering of content displayed on the second student computing device, receiving updated student interaction information that indicates activities of the first student on the first student computing device and the second student on the second student computing device;

based on the updated student interaction information, identifying, among the first student and the second student, one or more of the students who are viewing the educational content and one or more of the students who are engaging in an activity other than viewing the educational content; and providing updated instructions to display the updated data identifying the one or more students who are viewing the educational content and updated data identifying the one or more students who are engaging in an activity other than viewing the educational content.

9. A system comprising:

one or more computers; and one or more storage devices storing instructions that are operable, when executed by the one or more computers, to cause the one or more computers to perform operations comprising:

receiving, over a network, from a teacher computing device, and by a server, an indication of educational content to be viewed by a first student on a first student computing device and by a second student on a second student computing device;

notifying, over the network and by the server, the first student computing device and the second student computing device that the educational content is to be viewed;

receiving, over the network, by the server, and from the first student computing device, first student interaction information that indicates a first activity of the first student on the first student computing device;

receiving, over the network, by the server, and from the second student computing device, second student interaction information that indicates a second activity of the second student on the second student computing device;

based on the first student interaction information, determining, by the server, that the first student is engaging, on the first student computing device, in an activity other than viewing the educational content;

based on the second student interaction information, determining, by the server, that the second student is viewing, on the second student computing device, the educational content;

based on determining that the first student is engaging in the activity other than viewing the educational content, providing, over the network, by the server, and to the teacher computing device, instructions to (i) display data indicating that the first student is engaging in the activity other than viewing the educational content and (ii) display a selectable option that, upon selection by a user, is configured to request a graphical rendering of content displayed on the first student computing device;

based on determining that the second student is viewing the educational content, providing, over the network, by the server, and to the teacher computing device, instructions to display data indicating that the second student is viewing the educational content without displaying a selectable option that, upon selection by the user, is configured to request a graphical rendering of content displayed on the second student computing device;

receiving, over the network, by the server, and from the teacher computing device, data indicating a selection of the selectable option that is configured to request a graphical rendering of content displayed on the first student computing device; and in response to receiving the data indicating the selection of the selectable option that is configured to request the graphical rendering of content displayed on the first student computing device, providing, over the network, by the server, and to the teacher computing device for display on the teacher computing device, the graphical rendering of content displayed on the first student computing device.

10. The system of claim 9, comprising:
determining a first percentage of students that include the first student and the second student who are viewing the educational content;
determining a second percentage of students that include the first student and the second student are engaging in an activity other than viewing the educational content; and
providing, over the network, by the server, and to the teacher computing device for display on the teacher computing device, data indicating the first percentage of students and the second percentage of students.

11. The system of claim 9, wherein providing, over the network, by the server, and to the teacher computing device, instructions to (i) display data indicating that the first student is engaging in the activity other than viewing the educational content and (ii) display a selectable option that, upon selection by a user, is configured to request a graphical rendering of content displayed on the first student computing device comprises:

providing instructions to display data indicating what is currently being displayed on the first student computing device.

12. The system of claim 9, the operations further comprising:
after providing instructions to (i) display data indicating that the first student is engaging in the activity other than viewing the educational content and (ii) display a selectable option that, upon selection by a user, is configured to request a graphical rendering of content displayed on the first student computing device and after providing instructions to display data indicating that the second student is viewing the educational content without displaying a selectable option that, upon selection by the user, is configured to request a graphical rendering of content displayed on the second student computing device, receiving updated student interaction information that indicates activities of the first student on the first student computing device and the second student on the second student computing device;

based on the updated student interaction information, identifying, among the first student and the second student, one or more of the students who are viewing the educational content and one or more of the students who are engaging in an activity other than viewing the educational content; and providing updated instructions to display the updated data identifying the one or more students who are viewing the educational content and updated data identifying the one or more students who are engaging in an activity other than viewing the educational content.

13. The method of claim 1, wherein:
determining that the first student is engaging in an activity other than viewing the educational content comprises:
identifying an activity of the first student, and
providing instructions to display data indicating that the first student is engaging in an activity other than viewing the educational content comprises:
providing data identifying the activity of the first student.

14. The method of claim 13, wherein the data identifying the activity of the first student comprises a textual description of the activity.

15. The method of claim 1, comprising:
in response to receiving the data indicating a selection of the selectable option that is configured to request a graphical rendering of content displayed on the first student computing device, providing, over the network, by the server, and to the first student computing device, the request for the graphical rendering of content displayed on the first student computing device; and
receiving, over the network, by the server, and from the first student computing device, the graphical rendering of content displayed on the first student computing device.

16. The method of claim 1, comprising:
based on the first student interaction information, identifying the activity other that viewing the educational content;
wherein the data indicating that the first student is engaging in the activity other than viewing the educational content comprises data identifying the activity other that viewing the educational content.

17. The method of claim 1, wherein the activity other that viewing the educational content comprises viewing a selection screen.

\* \* \* \* \*